US011095711B2

(12) United States Patent
Kapur et al.

(10) Patent No.: US 11,095,711 B2
(45) Date of Patent: *Aug. 17, 2021

(54) DNS RESOLUTION OF INTERNAL TENANT-SPECIFIC DOMAIN ADDRESSES IN A MULTI-TENANT COMPUTING ENVIRONMENT

(71) Applicant: International Business Machines Corporation, Armonk, NY (US)

(72) Inventors: Ashish Kapur, Santa Clara, CA (US); Tamanna Z. Sait, San Jose, CA (US); Zi Jin Tao, Wuxi (CN); Lu Zhang, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,249

(22) Filed: Sep. 27, 2019

(65) Prior Publication Data
US 2020/0028892 A1 Jan. 23, 2020

Related U.S. Application Data

(63) Continuation of application No. 15/386,844, filed on Dec. 21, 2016, now Pat. No. 10,476,942.

(51) Int. Cl.
*H04L 29/08* (2006.01)
*H04L 29/12* (2006.01)

(52) U.S. Cl.
CPC .......... *H04L 67/10* (2013.01); *H04L 61/1511* (2013.01)

(58) Field of Classification Search
CPC . H04L 61/1511; H04L 67/02; H04L 67/1008; H04L 67/10; G06F 9/505; G06F 15/167; H04N 21/2181
(Continued)

(56) References Cited

U.S. PATENT DOCUMENTS 8,966,077 B2   2/2015  Aras
9,898,317 B2 * 2/2018  Nakil ................... H04L 43/10
(Continued)

OTHER PUBLICATIONS

Labriola, Donald J.; List of IBM Patents or Patent Application Treated as Related; 1 page.

*Primary Examiner* — Tesfay Yohannes
(74) *Attorney, Agent, or Firm* — Schmeiser, Olsen & Watts; Nicholas L. Cadmus

(57) ABSTRACT

A method and associated systems for a multi-tenant DNS mechanism. A multi-tenant computing environment hosts multiple private overlay networks, each of which comprises one tenant's domain. A multi-tenant DNS agent receives a DNS request to resolve a domain address located within the multi-tenant environment. The agent examines a special record within the request to determine whether the request requires resolving the domain address to an internal tenant-specific network identifier within a tenant's private network. The agent then forwards the request to a DNS server, notifying the server whether the requested address resolution is tenant-specific. If the request is not tenant-specific, the server performs a conventional DNS lookup. But if the request is tenant-specific, the DNS server instead performs a lookup into a tenant-specific local database that allows the domain address to be resolved to an internal address visible only within the multi-tenant computing environment.

20 Claims, 7 Drawing Sheets

(58) Field of Classification Search
USPC .................................. 709/212, 245; 726/23
See application file for complete search history.

(56) References Cited

U.S. PATENT DOCUMENTS

| | | |
|---|---|---|
| 2012/0131156 A1 | 5/2012 | Brandt |
| 2012/0131177 A1* | 5/2012 | Brandt ................ H04L 61/1511 709/224 |
| 2013/0191915 A1* | 7/2013 | Antonakakis ........... G06F 21/55 726/23 |
| 2014/0090037 A1 | 3/2014 | Singh |
| 2014/0215590 A1 | 7/2014 | Brand |
| 2015/0082431 A1* | 3/2015 | Davis ................ H04L 63/1441 726/23 |
| 2015/0254088 A1* | 9/2015 | Chou ...................... G06F 3/061 709/212 |
| 2015/0264077 A1* | 9/2015 | Berger ............... H04L 63/1441 726/23 |
| 2016/0036857 A1 | 2/2016 | Foxhoven |
| 2016/0142251 A1* | 5/2016 | Contreras ............... H04L 45/70 709/220 |
| 2017/0171146 A1* | 6/2017 | Sharma ............... H04L 67/2804 |
| 2017/0331786 A1* | 11/2017 | Lai ........................ G06F 40/129 |
| 2017/0339174 A1* | 11/2017 | Mounaguruswamy ..................... G06F 16/285 |
| 2018/0176176 A1 | 6/2018 | Kapur |

* cited by examiner

DNS RESOLUTION OF INTERNAL TENANT-SPECIFIC DOMAIN ADDRESSES IN A MULTI-TENANT COMPUTING ENVIRONMENT

CROSS REFERENCE TO RELATED APPLICATIONS

This application is a continuation application claiming priority to Ser. No. 15/386,844 filed Dec. 21, 2016, now U.S. Pat. No. 10,476,942, issued Nov. 12, 2019, the contents of which are hereby incorporated by reference.

BACKGROUND

The present invention relates to multi-user networks and, in particular, to methods and systems for simplifying domain-name resolution services in a multi-user computing environment like a multi-tenant cloud-computing platform.

A data center configured to provide cloud-computing services to multiple "tenant" clients may isolate each tenant from other tenants by assigning to each client exactly one distinct domain name, such as www.Tenant1.com, www.Tenant2.com, or www.Tenant3.com. On a TCP/IP network, a pair of such domains is said to "overlap" if they both resolve to the same IP address. This may occur in a multi-tenant cloud that is configured to provide a distinct virtual domain or private network to each tenant.

In such situations, a computing platform may differentiate overlapping domains by assigning internal addresses to a URL within a tenant's private domain, and by using a private domain name system (DNS) server to resolve each tenant's internal addresses. For example, if Tenant1 and Tenant2 are tenants of the same cloud, third-party references to URLs within the www.Tenant1.com and www.Tenant2.com domains may initially resolve, through publicly accessible Internet DNS servers, to the same cloud-provider IP address. But when internal DNS requests originating from a tenant attempt to access an internal resource of the multi-tenant cloud, they might instead be redirected by a cloud-management platform to one or more internal or private tenant-specific DNS servers. These internal DNS servers would then resolve each reference to a private network address or other unique identifier that is specific to one tenant. In such implementations, dedicating a DNS server to each tenant can become inefficient and cumbersome in environments populated by large numbers of tenants. There is thus a need for a more efficient way to perform internal domain-name resolution to private domains within multi-tenant platforms that comprise many overlapping domains. More specifically, there is a need for a way to fully implement DNS functionality on a multi-tenant network without requiring a dedicated DNS server for each tenant.

BRIEF SUMMARY

An embodiment of the present invention provides a DNS-resolution system comprising a processor, a memory coupled to the processor, and a computer-readable hardware storage device coupled to the processor, the storage device containing program code configured to be run by the processor via the memory to implement a method for a multi-tenant DNS mechanism, the method comprising:
receiving a DNS request to resolve a domain address to an Internet Protocol address,
where the domain address identifies a networked entity comprised by a multi-tenant computing environment, and where the multi-tenant computing environment comprises a set of private networks that each host one tenant's domain of a set of tenant domains;
extracting a Tenant-ID record from the DNS request;
determining whether the Tenant-ID record indicates that the DNS request comprises a request for a tenant-specific domain-address resolution; and
forwarding the DNS request to a multi-tenant DNS server along with a notification of whether the DNS request requires a tenant-specific domain-address resolution.

Another embodiment of the present invention provides method for a multi-tenant DNS mechanism comprising:
a processor of a computer system receiving a DNS request to resolve a domain address to an Internet Protocol address,
where the domain address identifies a networked entity comprised by a multi-tenant computing environment, and where the multi-tenant computing environment comprises a set of private networks that each host one tenant's domain of a set of tenant domains;
the processor extracting a Tenant-ID record from the DNS request;
the processor determining whether the Tenant-ID record indicates that the DNS request comprises a request for a tenant-specific domain-address resolution; and
the processor forwarding the DNS request to a multi-tenant DNS server along with a notification of whether the DNS request requires a tenant-specific domain-address resolution Yet another embodiment of the present invention provides a computer program product, comprising a computer-readable hardware storage device having a computer-readable program code stored therein, the program code configured to be executed by a DNS-resolution system comprising a processor, a memory coupled to the processor, and a computer-readable hardware storage device coupled to the processor, the storage device containing program code configured to be run by the processor via the memory to implement a method for a multi-tenant DNS mechanism, the method comprising:
receiving a DNS request to resolve a domain address to an Internet Protocol address,
where the domain address identifies a networked entity comprised by a multi-tenant computing environment, and where the multi-tenant computing environment comprises a set of private networks that each host one tenant's domain of a set of tenant domains;
extracting a Tenant-ID record from the DNS request;
determining whether the Tenant-ID record indicates that the DNS request comprises a request for a tenant-specific domain-address resolution; and
forwarding the DNS request to a multi-tenant DNS server along with a notification of whether the DNS request requires a tenant-specific domain-address resolution.

DETAILED DESCRIPTION

Figure 1:
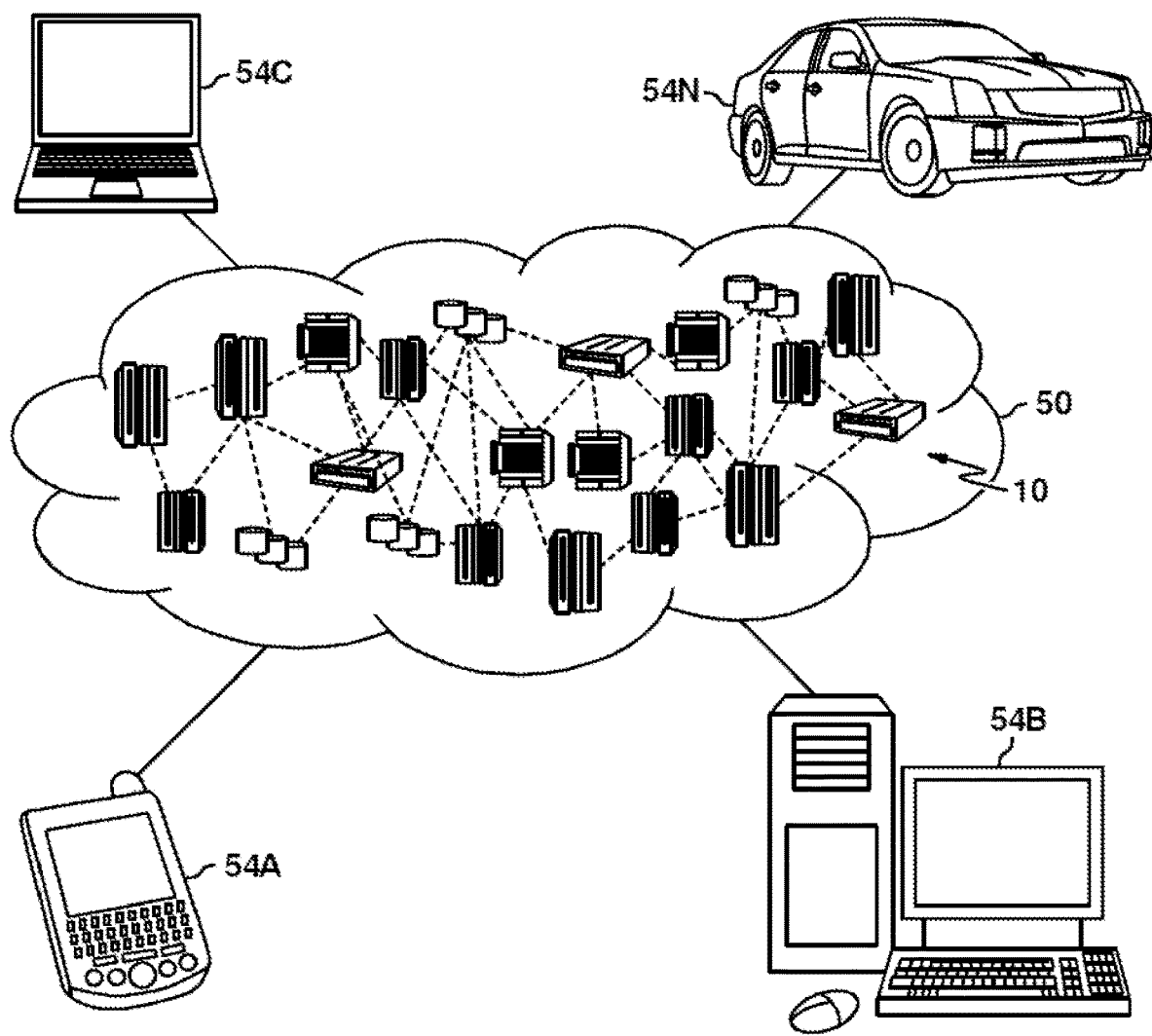
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
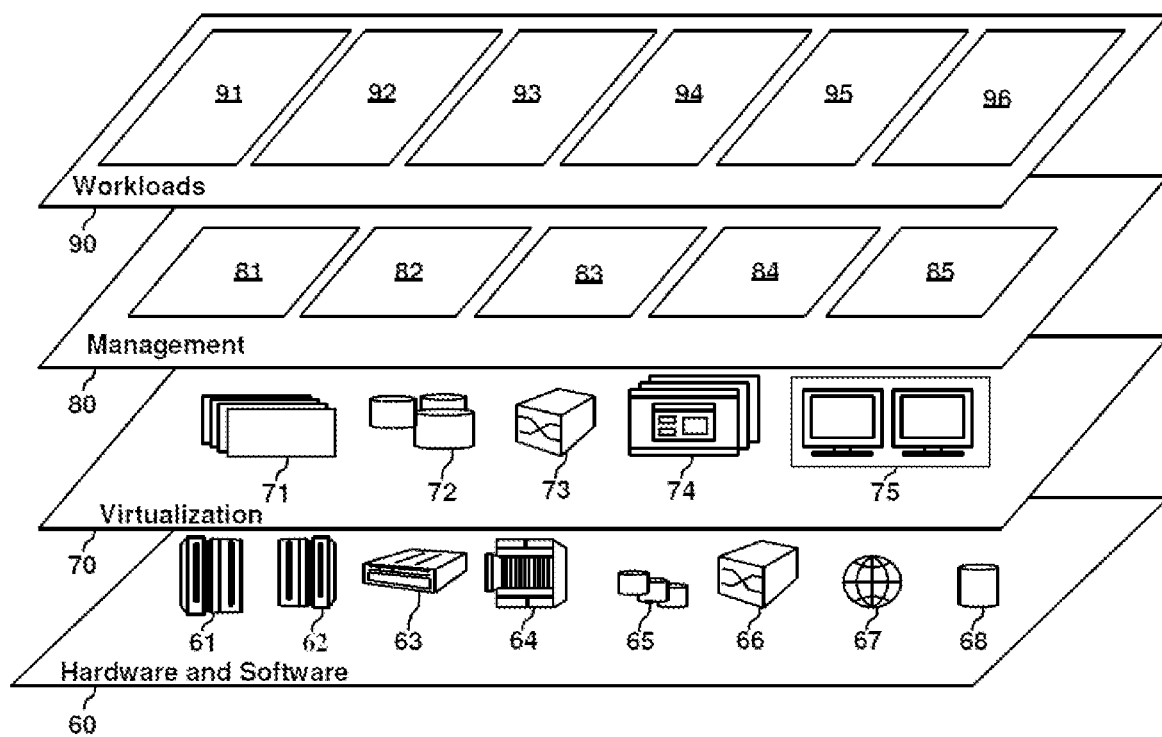
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DNS resolution of overlapping domains in a multi-tenant computing environment.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
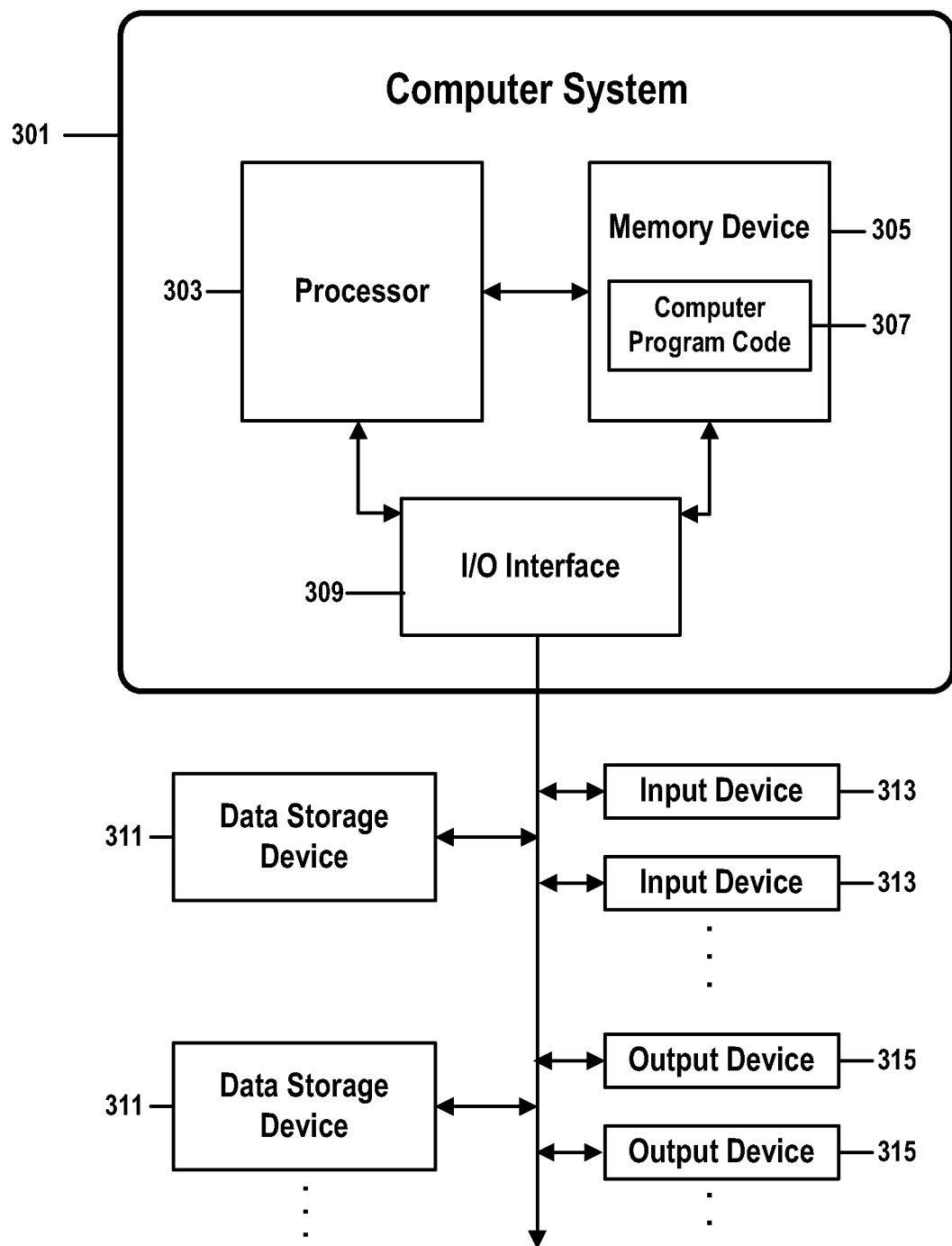
FIG. 3 shows the structure of a computer system and computer program code that may be used to implement a method for a multi-tenant DNS mechanism in accordance with embodiments of the present invention.

FIG. 3 shows a structure of a computer system and computer program code that may be used to implement a method for a multi-tenant DNS mechanism in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a multi-tenant DNS mechanism in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a multi-tenant DNS mechanism.

Any of the components of the present invention could be created, integrated, hosted, maintained, deployed, managed, serviced, supported, etc. by a service provider who offers to facilitate a method for a multi-tenant DNS mechanism. Thus the present invention discloses a process for deploying or integrating computing infrastructure, comprising integrating computer-readable code into the computer system 301, wherein the code in combination with the computer system 301 is capable of performing a method for a multi-tenant DNS mechanism.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

While it is understood that program code 307 for a method for a multi-tenant DNS mechanism may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a multi-tenant DNS mechanism is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
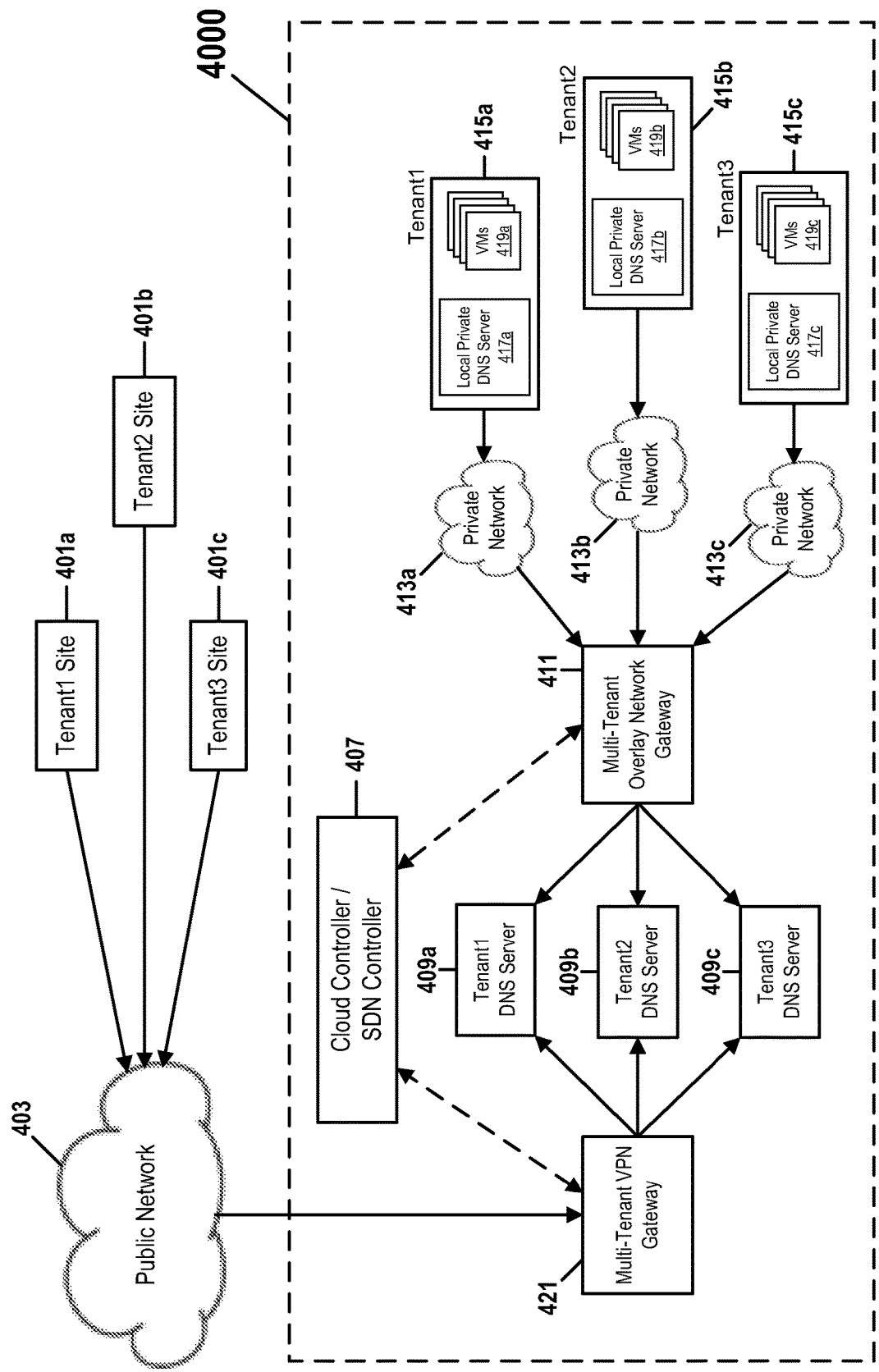
FIG. 4 illustrates a legacy distributed architecture for managing DNS requests to overlapping domains in a multi-tenant computing environment.

FIG. 4 illustrates a legacy distributed architecture for managing DNS requests to overlapping domains in a multi-tenant computing environment. FIG. 4 shows items 401a-421 and 4000.

Item 4000 is a partial view of a distributed data center designed to support a multi-tenant computing platform, such as a multi-tenant cloud-computing service or an enterprise network infrastructure. The example of FIG. 4 shows this platform as a multi-tenant cloud-computing environment, but should not be construed to limit embodiments to only cloud platforms.

This environment supports tenants (three of which are referred to in this example as "Tenant1," "Tenant2," and "Tenant3") that each may maintain an Internet Web site 401a-401c. Any of these tenants' Web sites 401a, 401b, or 401c may comprise pages, content, resources, or links identified by URLs within the domain of the site's tenant owner. If, for example, Tenant1 owns a domain "abc.com," Tenant1's Web site 401a may comprise Web pages, images, video clips, and ActiveX scripts identified by URLs within the abc.com domain 415a.

In a cloud environment, tenant domains 415a-415c may be implemented as cloud-based services, such as a platform-as-a-service (PaaS) virtualized operating environment, and may comprise local virtual infrastructure provisioned as an infrastructure-as-a-service (IaaS) service on a private virtual network 413a-413c. Such a network might comprise a combination of intranets, private cloud networks, or any other type of overlay network provisioned on an underlying network infrastructure. In the example of FIG. 4, a tenant's local virtual infrastructure may include, among other things, one or more virtual machines, virtual networks, or other virtual resources 419a-419c and a local DNS server 417a-417c associated with that tenant.

An optional local DNS server 417a, 417b, or 417c may be configured and exclusively used by a single tenant in that tenant's private cloud for the tenant's local name-resolution tasks. But when the tenant needs to resolve its own domain names to addresses outside the tenant's local infrastructure, the tenant may direct the tenant's local DNS server to recursively search for upper-level DNS servers. In some cases, a local DNS server of a tenant of a multi-tenant cloud-computing environment may perform name resolution tasks by means of virtual resources located within the cloud but outside of the tenant's own local infrastructure.

In our ongoing example, a user of Tenant1's Web site 401a may click a button linked to a URL within Tenant1's abc.com domain. Tenant1's Web site 401a responds by sending through the public Internet 403 a DNS request needed to identify an IP address of a resource identified by the URL. The DNS request is partially resolved by a conventional Internet DNS server (not shown) into an IP address of the data center 4000. The Internet DNS server cannot, however, further identify the internal IP address of the resource within Tenant1's internal infrastructure 415a.

The partially resolved DNS request is then forwarded in a conventional manner to data center 4000 a public network 403 through a VPN (virtual private network) 421. In some embodiments, each tenant Web site may connect to the data-center network environment 4000 through a dedicated VPN 421, but in other embodiments, a single multi-tenant VPN 421 may support multiple tenants.

The VPN 421, working in conjunction with a platform-management function 407 (such as a cloud-management platform or a software-defined network (SDN) controller) forwards the DNS request to a tenant-specific DNS server 409a, 409b, or 409c associated with the abc.com tenant domain. In this example, server 409a, which supports Tenant1, further resolves the URL into the IP address of the requested resource.

In some embodiments, a platform-management function 407 like a cloud controller or a network controller may have access to tenant-specific information about all tenants of the multi-tenant environment 4000, including information about the domains 415a-415c and private overlay networks 413a-413c of each tenant.

Conventional platforms may implement such tasks by provisioning or installing a distinct DNS server 409a-409c for each tenant, as shown in FIG. 4. Each of these DNS servers 409a, 409b, or 409c is capable of resolving domain-name addresses into internal IP addresses located within one tenant's domain. In the previous example, the DNS request sent by Tenant1 Web site 401a, would be resolved and directed to an IP address of multi-tenant gateway 421, which, working in conjunction with cloud-controller 407, then forwards the request to Tenant1's dedicated DNS server 409a.

In a typical case, the multi-tenant gateway 421 may work with cloud controller 407 by retrieving from controller 407 tenant-specific information necessary to resolve addresses within a particular tenant's domain or "zone." The Tenant1 DNS server 409a, using such a database of Tenant1's domain-related IP addresses, further resolves the DNS request into an internal IP address of a node of Tenant1's virtual infrastructure or domain 415a internal to data center 4000. This chain of events allows the original user action to be directed to the IP address of the requested Tenant1 resource within Tenant1's domain 415a.

Analogous procedures allow tenant-specific applications or services originating from locations internal to a tenant domain 415a, 415b, or 415c within a data center 4000 to access a resource or service external to that domain. Such an external resource or service may be located within a publicly accessible network of multi-tenant environment 4000, within another tenant's domain 415a-415c within multi-tenant environment 4000, or on a legacy or non-cloud network comprised by environment 4000. Because a tenant of multi-tenant platform 4000 has access to only that tenant's own private network or private cloud 413a, 413b, or 413c, performing domain-name resolution upon such accesses may require a mechanism similar to the one described above.

In one example, an application or other entity within a Tenant1 domain 415a provisioned within data-center 4000 requests access to a resource or service identified by a URL not located within that domain. This request may first be resolved into an IP address of Tenant1's local private network 413a by means of a local, tenant-specific, private DNS server 417a dedicated to Tenant1 and residing within Tenant1's domain 415a. (Other tenants may be associated with similar dedicated local private DNS servers 417b or 417c.) Each of these local private DNS servers 417a-417c may also be able to resolve other DNS requests that resolve to IP addresses within the server's own domain.

In some embodiments, one or more tenants may not be assigned a local private DNS server 417a-417c. In such cases, the tenant's DNS request may be sent directly to that tenant's private overlay network 413a-413c, which in turn forwards the request to an overlay-network gateway 411. In some embodiments, each tenant may have its own network gateway 411, but in other embodiments, a multi-tenant gateway 411 may serve multiple tenants.

Gateway 411, in conjunction with controller 407, may then forward the request to a dedicated DNS server 409a, 409b, or 409c that is associated with the requested domain. As before, the appropriate DNS server 409a, 409b, or 409c then fully resolves the DNS request into an IP address of the specific requested service or resource In another example, a user of a virtual machine 419b in Tenant2's domain 415b may perform a transaction that requests access to a resource located within a legacy TCP/IP network of data center 4000. Tenant2's local private DNS server 417b resolves the access request to an IP address of multi-tenant gateway 411.

This allows the request to be forwarded through Tenant2's private network 413b to gateway 411, which, working in conjunction with cloud controller 407, then forwards the DNS request to a DNS server of multi-tenant environment 4000 capable of fully resolving the requested URL. As in other examples, that DNS server resolves the DNS request into an IP address of the requested resource. The cloud controller 407 or other platform-management mechanism may then forward the user request to that IP address.

Both these procedures suffer from inefficiencies created by the fact that each tenant requires a dedicated DNS server 409a, 409b, or 409c in order to resolve internal references. In a real-world multi-tenant environment that may host thousands of tenants, such a requirement can become costly, complex, and unnecessarily resource-intensive. As will be explained in FIG. 5, embodiments of the present invention attempt to address this problem by means of multi-tenant DNS agents and multi-tenant DNS servers that take the place of a large number of dedicated servers 409a-409c.

Figure 5:
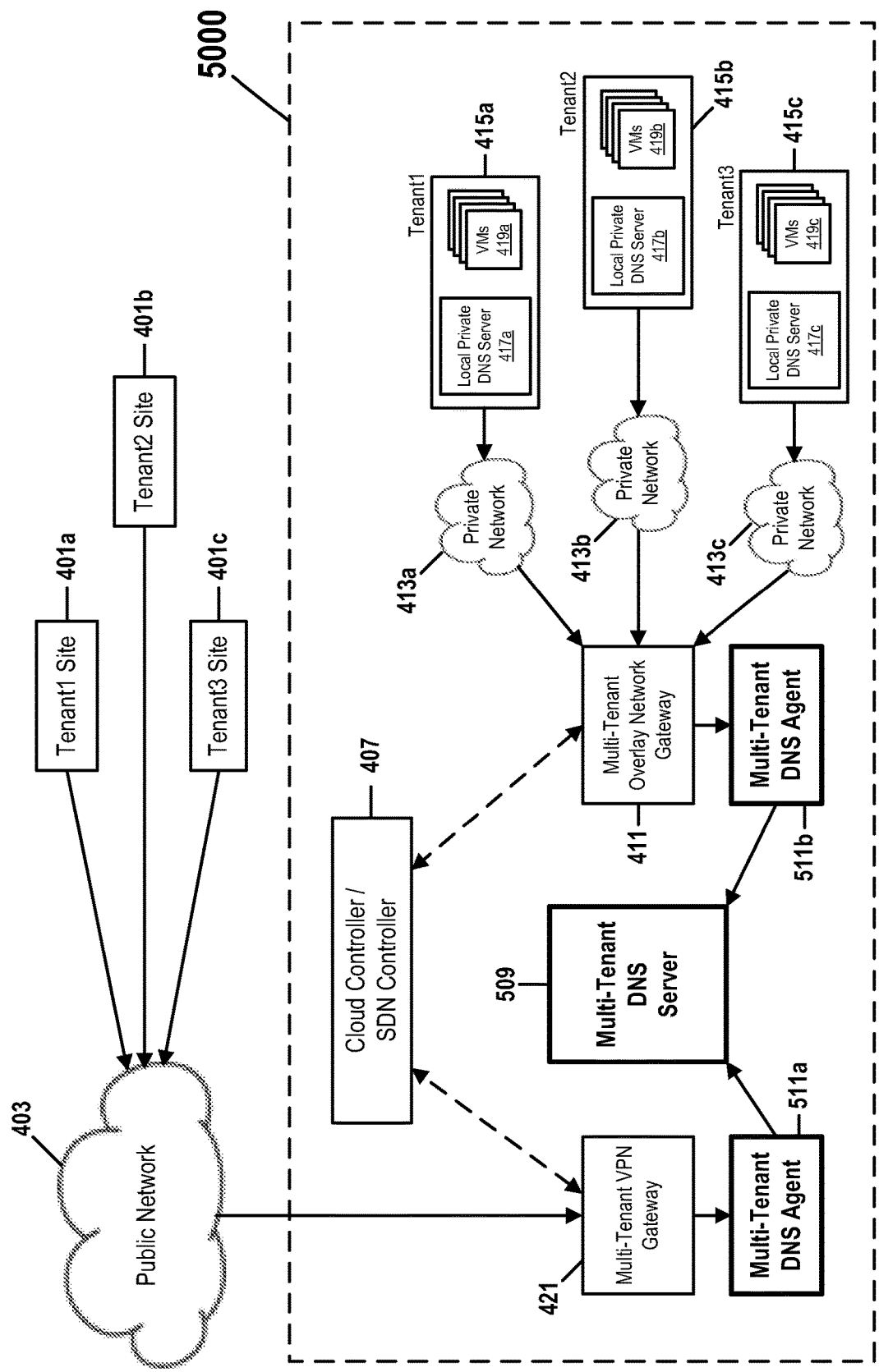
FIG. 5 illustrates a distributed, multi-tenant architecture similar to the distributed architecture of FIG. 4, but updated, to efficiently manage DNS requests to overlapping domains.

FIG. 5 illustrates a distributed, multi-tenant architecture 5000 similar to architecture 4000 of FIG. 4, but updated, in accordance with embodiments of the present invention, to more efficiently manage DNS requests to overlapping domains. FIG. 5 shows items 401a-421 and 5000.

Items 401a-401c, 403, 407, 413a-413c, 415a-415c, 417a-417c, and 421 are similar in structure and function to identically numbered items of FIG. 4. Like the multi-tenant environment 4000 of FIG. 4, multi-tenant environment 5000 hosts domains 415a, 415b, and 415c of three exemplary tenants that are respectively associated with sites 401a-401c.

As in FIG. 4, a tenant's Web site 401a, 401b, or 401c (or another external resource capable of linking to the tenant's domain) initiates a DNS-resolution procedure when an application or user of that site 401a-401c attempts to access a URL within the tenant's domain.

Unlike the example of FIG. 4, however, the DNS request in this case comprises a novel DNS Tenant Identification (Tenant-ID) record capable of indicating whether the DNS request requires tenant-specific domain-name resolution.

The Tenant-ID record may be formatted or structured in any manner desired by an implementer. In examples and embodiments described in this document, the Tenant-ID record is formatted in accordance with the standard DNS resource record (RR) format (specified by IETF STD 13 RFC 1035 "Domain names —implementation and specification, November 1987").

Figure 6:
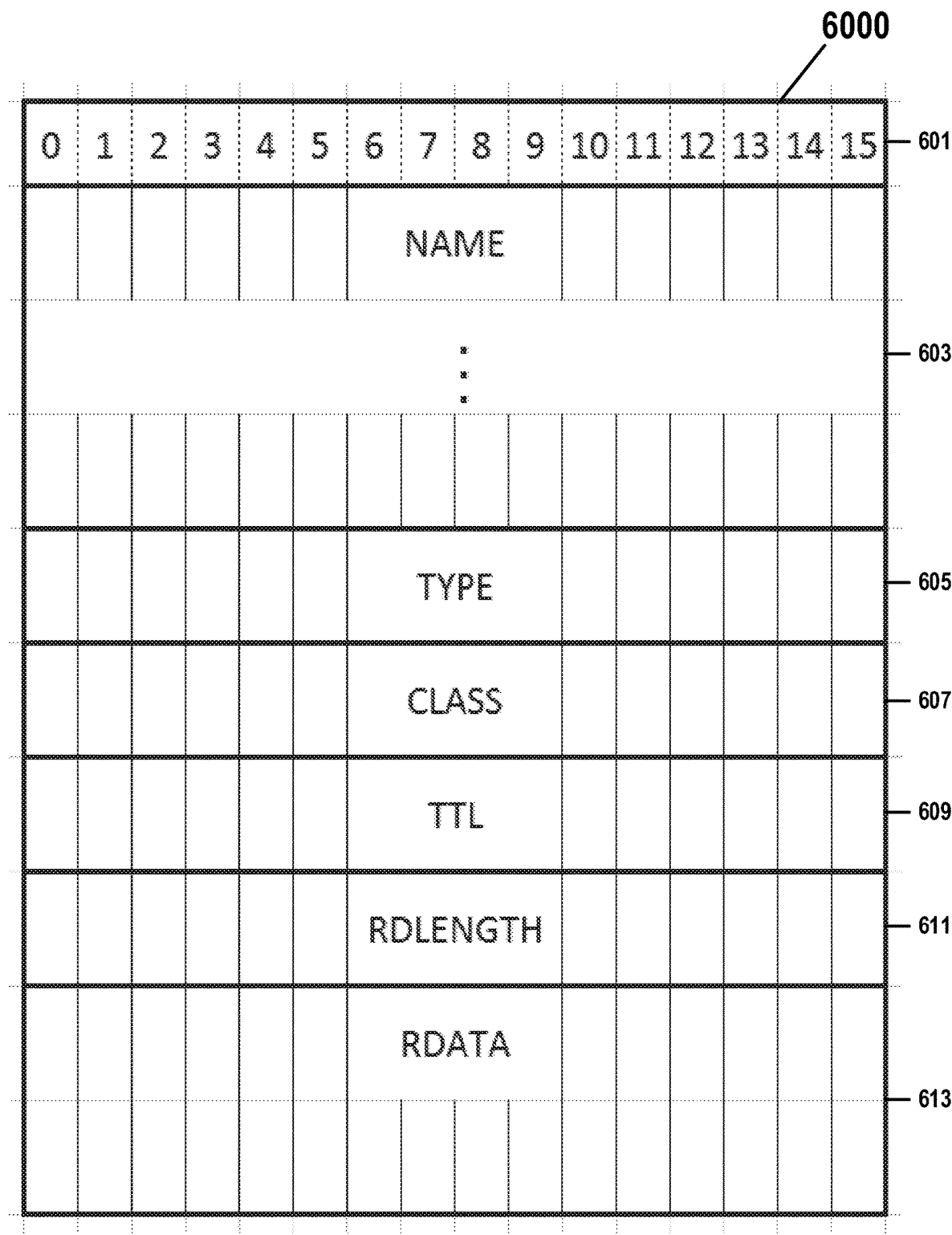
FIG. 6 illustrates the structure of a Tenant-ID record in accordance with embodiments of the present invention.

Conforming to this standard allows the record to be inserted into a standard type of DNS request that is known in the art and used widely throughout the Internet and other TCP/IP networks. This approach allows embodiments of the present invention to maintain backward-compatibility with currently known domain-name resolution methods. An example of such a record is shown in FIG. 6.

As in FIG. 5, the DNS request is forwarded through public network 403 to a VPN gateway 421 within multi-tenant operating environment 5000. However, in this case, the gateway 421 forwards the request to multi-tenant DNS agent software 511a.

The DNS agent 511a may examine the DNS request to identify that it comprises a Tenant-ID record or, in embodiments that add a Tenant-ID record to every DNS request, may attempt to identify that the received request's Tenant-ID record specifies that the DNS request must resolve a URL of an overlapping domain 415a-415c within the multi-tenant environment 5000. In either case, such an identification determines that the Tenant-ID or DNS record request specifies a "tenant-specific option."

DNA agent 511a then forwards the DNS request to a multi-tenant DNS server 509, along with the agent's 511a determination of whether the request specifies a tenant-specific option.

Unlike conventional DNS servers, multi-tenant DNS server 509 contains two types of lookup databases, each associated with either a "global zone" or a "tenant zone." When determining that an address does not require tenant-specific resolution, address resolution may be accomplished by means of a conventional address lookup in the global zone database. But DNS requests like those described in FIG. 4, which must resolve a private tenant address (internal to the tenant's domain within the multi-tenant environment) are instead looked up in a tenant-zone database that is dedicated to that single tenant. These tenant-zone databases may each comprise one or more lookup tables similar to those of tenant-dedicated DNS servers 409a-409c of FIG. 4, allowing resolution of a URL or other network address to a unique private identifier within one of the overlapping tenant domains 415a-415c. In some embodiments, one or more of these tenant-zone databases may be aggregated into one or more "whole-zone" databases maintained by one or more multi-tenant DNS servers 509.

If the Tenant-ID record does not identify a "tenant-specific option," the DNS request is processed in a conventional manner used for non-overlapping domains, such as those not hosted on a multi-tenant network, cloud-computing platform, or other type of operating environment. In such cases, the DNS request may also be resolved by means of a global address lookup by a public DNS server.

Embodiments of the present invention may employ a similar mechanism to resolve a DNS request that originates from a resource internal to the multi-tenant environment 5000. If that DNS request requests resolution of an address in a domain that is not an overlapping domain within the multi-tenant environment 5000, a multi-tenant DNS agent 511b, upon receiving the DNS request from a tenant's private overlay network 413a-413c, directs multi-tenant DNS server 508 to perform a standard address lookup from its global-zone database.

But if the agent 511b determines that the request specifies a tenant-specific option, the agent 511b directs the multi-tenant DNS server 508 to perform its lookup from its tenant-zone database. This latter situation occurs when the address to be resolved does not lie within an overlapping domain such as when the address identifies a resource located a legacy, non-cloud, or publicly available region of the multi-tenant environment 5000.

As above, the multi-tenant DNS server 508 then resolves the URL specified by the DNS request into a network address, using either a global or a tenant-specific internal lookup database.

FIG. 6 illustrates the structure of a Tenant-ID record 6000 in accordance with embodiments of the present invention. FIG. 6 comprises items 601-613 and 6000.

As described above, a Tenant-ID record 6000 is a novel resource record comprised by a DNS request. When such a request is intercepted by DNS agent 511a or 511b or multi-tenant DNS server 509 of an embodiment of the present invention, that intercepting module uses information contained in the record 6000 to determine whether the request requires a domain name to be resolved to a tenant-specific address (that is, to an address within an overlapping tenant domain) or to a non-overlapping "global" address.

Each Tenant-ID record 6000 may be formatted or structured in any manner desired by an implementer. In the example of FIG. 6, the structure of Tenant-ID record 6000 is, for purposes of backward compatibility, shown to comply with the standard DNS resource record (RR) format. The overarching DNS Message format into which such a record may be included is defined by IETF RFC 1035 4.1 (especially section 3.2 and related RFC 2137). Tenant-specific information may be also added to the additional Tenant-ID resource record in conformance with the DNSSEC "DNS Security" standard.

Conforming to these standards provides backward compatibility and allows the record to be integrated into a known DNS-based domain-name resolution mechanism used widely throughout the Internet and on other TCP/IP networks.

Header 601 has been added to FIG. 6 solely for pedagogical purposes and may not be present in an actual Tenant-ID record. The intent of showing header 601 in this figure is to show that the width of an RFC 1035-compliant record is 16 bits, where each column of a row of the record 6000 corresponds to a single bit of data. Each row in FIG. 6 thus consists of two octets (or eight-bit bytes).

NAME field 603 identifies the tenant domain from which the DNS request originated. This field 603 may be of indefinite length, as required to store the full name.

TYPE field 605 consists of two octets that identify the resource record as specifying a tenant-specific option. Any otherwise-unused value may be selected to indicate the tenant-specific option. If, for example, hexadecimal value 00 FB is chosen to identify the tenant-specific option, a Tenant-ID record 6000 that comprises a TYPE 605=00 FB identifies that the DNS request comprising that record requires a tenant-specific address resolution to an overlapping domain. Any other TYPE value would then identify that the DNS request does not require tenant-specific address resolution.

A two-octet CLASS field 607 should be loaded with hexadecimal value 00 FF to indicate that the Tenant-ID resource record 6000 may be associated with any RFC 1035-complaint resource-record class.

A four-octet TTL field 609 may be set to a zero value, indicating that information comprised by the Tenant-ID record 6000 should not be cached or stored, and should be used only for the current DNS name resolution request.

A two-octet RDLENGTH 611 field is set to a value of 16, indicating the length, in octets, of RDATA field 613.

RDATA field 613 is a 16-octet (128-bit) field that contains a UUID (universally unique identifier) of the tenant from which the DNS request originated. As known in the art, software applications and systems often employ UUIDs to identify users, applications, resources, or other entities. Embodiments of the present invention are flexible enough to accommodate any coding scheme used by such a system, so long as each tenant is uniquely identified by a single UUID value.

Figure 7:
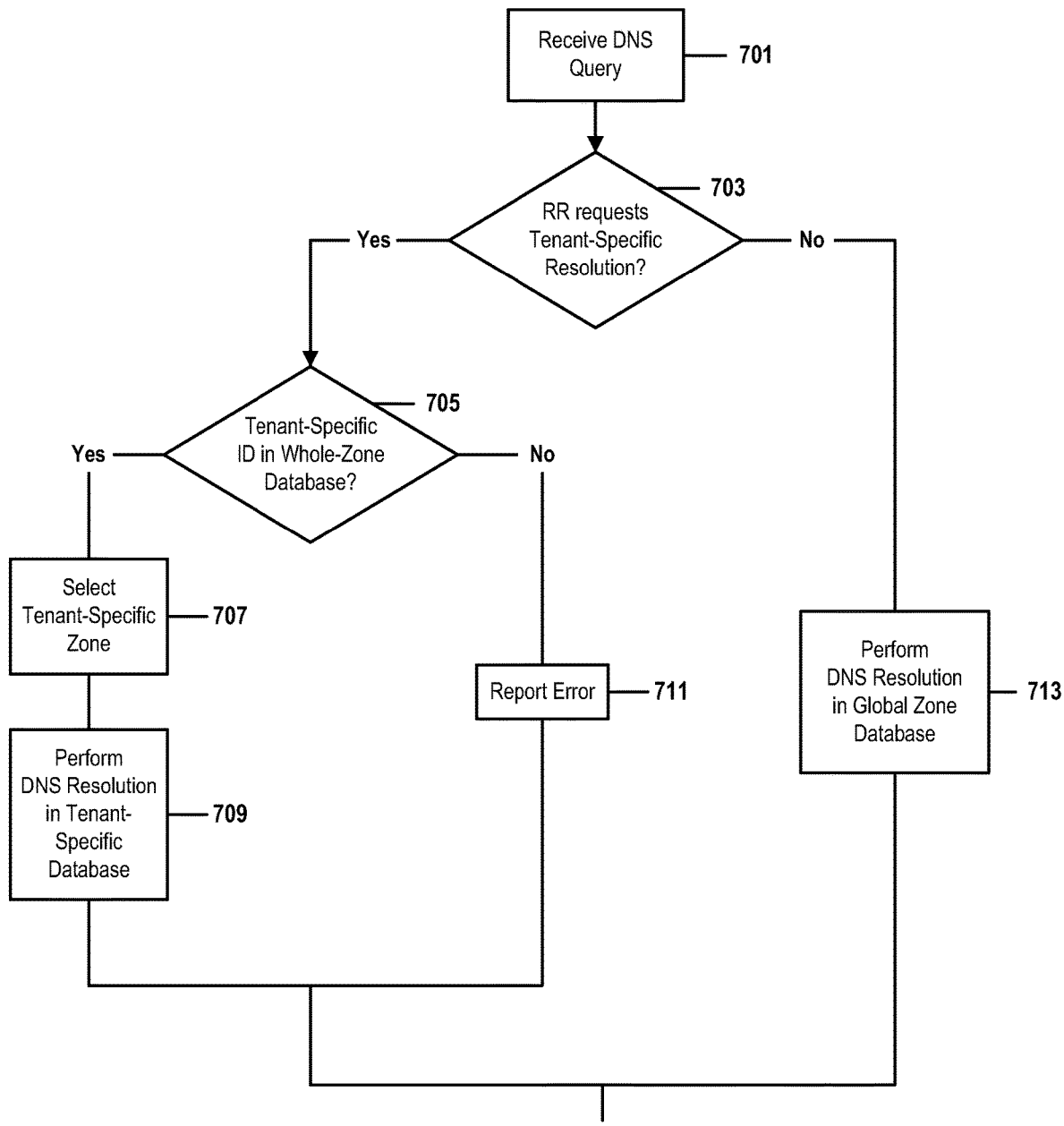
FIG. 7 is a flow chart that illustrates steps of a method for a multi-tenant DNS mechanism in accordance with embodiments of the present invention.

FIG. 7 is a flow chart that illustrates steps of a method for a multi-tenant DNS mechanism in accordance with embodiments of the present invention. FIG. 7 comprises steps 701-713.

In step 701, a multi-tenant DNS agent 511*a* or 511*b* located in a multi-tenant operating environment 5000 receives a DNS request. Agent 511*a* and 511*b* are part of an efficient DNS system capable of resolving references to overlapping domains in a multi-tenant environment. In some embodiments, a single agent may provide the functionality of both agent 511*a* and 511*b*. Other embodiments may comprise multiple instances of agent 511*a* or multiple instances of agent 511*b*, each of which may serve a subset of the set of tenants hosted by multi-tenant environment 5000.

As described in FIG. 5, the DNS request may have been sent from a tenant domain 415*a*-415*c* and then forwarded by the tenant's optional local private DNS server 417*a*-417*c*, through the respective tenant's private, virtual, or overlay network 413*a*-413*c*, to a multi-tenant overlay-network gateway 411. In such embodiments, domains 415*a*-415*c*, private DNS servers 417*a*-417*c*, private networks 413*a*-413*c*, and gateway 411 are all local to environment 5000.

In other cases, the DNS request may have originated from a Web site, application, or service 401*a*-401*c* located in a public network 403, such as the Internet, that is external to multi-tenant environment 5000. In such cases, the DNS request will have been forwarded through the public network 403 to a multi-tenant VPN gateway 421 located within environment 5000.

In either case, multi-tenant gateway 411 or 421 will then pass the DNS request to multi-tenant DNS agent 511*a* or 511*b*, depending on whether the request originated from a private network 413*a*-413*c* or a public network 403. In this way, gateways 411 and 421 may aggregate and organize incoming DNS requests and then forward each one to a multi-tenant agent 511*a* or 511*b* that analyzes the DNS request and delivers the request, along with address-resolution instructions, to a multi-tenant DNS server 509.

In step 703, agent 511*a* or 511*b*, upon receiving the DNS request, extracts a Tenant-ID resource record 6000 from the DNS request. As explained in FIG. 6, Tenant-ID record 6000 conforms to popular conventions and IETF standards, and contains information that allows agent 511*a* or 511*b* to determine whether the DNS request requires a local "tenant-specific" address resolution. Such a tenant-specific resolution is required when the domain address to be resolved belongs to an overlapping domain of the multi-tenant environment 5000.

As is known in the art, a domain-name address located within an overlapping domain cannot be straightforwardly resolved to a unique IP address because, outside the multi-domain environment, overlapping domains are identified by only the IP address of the domain's multi-domain environment. Such a DNS request can thus be resolved by a conventional public-network "global" DNS server into only an address of the multi-tenant environment 5000, such as an IP address of gateway 411 or 421, of agent 511*a* or 511*b*, or of multi-tenant DNS server 509. In these cases, additional "tenant-specific" address resolution is required in order to identify a non-overlapping internal address that uniquely identifies a resource within the multi-tenant environment 5000.

If the agent 511*a* or 511*b* notifies multi-tenant DNS server 509 that tenant-specific address-resolution is required, server 509 will, in steps 705-709, perform the requested address resolution by means of a lookup into a "tenant-zone" or "local-zone" database of the multi-tenant DNS server 509. In some embodiments, some or all of these tenant-zone databases may be stored in one or more "whole-zone" databases that aggregate the tenant-zone databases. If, however, the address to be resolved does not resolve to an internal address within a tenant's private domain, agent 511*a* or 511*b* will instruct the DNS server 509 to perform a conventional address-resolution procedure that comprises looking up an IP address in a conventional DNS server's "global-zone" database. Such global resolution is sufficient when a URL or domain-name address resolves to a unique IP address that may be associated with only one distinct entity visible from outside the multi-tenant environment.

In this step, agent 511*a* or 511*b* determines whether the DNS request requires a tenant-zone or a global-zone address resolution by examining the Tenant-ID resource record 6000 comprised by the received DNS request. As explained in FIG. 6, if TYPE field 605 of the Tenant-ID resource record 6000 contains a predetermined 16-bit value, agent 511*a* or 511*b* determines that a tenant-specific resolution is required. This document refers to such a requirement as a "tenant-specific option." If, for example, hexadecimal value 00 FB is chosen to represent the tenant-specific option, a Tenant-ID record 6000 that comprises a TYPE 605 field set to the value 00 FB identifies that a DNS request comprising that record requires a tenant-specific address resolution to an address located within an overlapping domain of the multi-tenant environment 5000. In this case, any other value stored in the TYPE 605 field would instead indicate that the DNS request does not require tenant-specific address resolution.

In some embodiments, if agent 511*a* or 511*b* receives a DNS query that specifies only the IP destination address of multi-tenant DNS server 509 (or of gateway 411 or 412, or agent 511*a* or 511*b*), agent 511*a* or 511*b* may request further tenant-identifying information from associated gateway 411 or 421 or from controller 407. Agent 511*a* or 511*b* would then update the Tenant-ID record as necessary to identify a particular tenant-specific domain address, and set the TYPE 605 field to a value that identifies a need to perform a tenant-specific resolution.

In other cases, the DNS request may arrive having already been fully populated by a requesting entity at the time that the DNS request is created. This requesting entity might, for example, be a virtual machine 419*a*-419*c* located within a tenant's domain 415*a*-415*c* within the multi-tenant environment 5000. In such a case, if the DNS request specifies an address within a second tenant's domain 415*a*, 415*b*, or 415*c*, an embodiment of the present invention is required in order to perform a tenant-specific resolution of that second-tenant address. This requirement exists because each tenant is hosted on a private network, dedicated to only that particular tenant, and is not privy to addresses internal to other tenant's private networks.

If the agent 511*a* or 511*b* determines in this step that the Tenant-ID does not specify the tenant-specific option, then the method of FIG. 7 performs step 713 in order to perform a conventional "global" domain-name address resolution. This procedure comprises forwarding the DNS request to multi-tenant DNS server 509, which then performs a conventional address lookup in its "global" database. This lookup identifies an Internet Protocol address that uniquely corresponds to the domain address specified by the DNS request. At the conclusion of step 713, the method of FIG. 7 concludes, having performed the address-resolution task requested by the DNS request.

If, however, the agent determines in step 703 that the Tenant-ID does specify the tenant-specific option, then agent

511*a* or 511*b* again forwards the DNS request to multi-tenant DNS server 509, but the method of FIG. 7 instead proceeds with steps 705-711.

In step 705, the DNS server 509 retrieves from the Tenant-ID's NAME field 603 the name of the tenant-specific domain that contains the domain address to be resolved. The server 509 then attempts to locate a tenant-specific local database (or "lookup table") that corresponds to the specified tenant.

If the DNS server 509 locates a tenant-specific database or lookup table" for the desired tenant, the method of FIG. 7 continues with steps 707 and 709. But if DNS server 509 determines that no such database is available for the specified tenant, then the method of FIG. 7 concludes with step 711.

In step 711, DNS server 509 reports an error condition identifying that a tenant-specific address resolution could not be performed.

In step 707, DNS server 509 initiates a tenant-specific address-resolution procedure by selecting the database identified in step 705.

In step 709, DNS server 509 performs tenant-specific address resolution requested by the DNS request by performing an address lookup in the database or lookup table identified in step 705 as being specific to the tenant identified by the Tenant-ID's NAME field 603. This lookup returns an internal address not visible outside the multi-tenant computing environment 5000. That internal address uniquely identifies the resource originally requested by the entity that generated the DNS request.

What is claimed is:

1. A DNS-resolution system comprising a processor, a memory coupled to the processor, and a computer-readable hardware storage device coupled to the processor, the storage device containing program code configured to be run by the processor via the memory to implement a method for multi-tenant DNS resolution, the method comprising:
    receiving a DNS request to resolve a domain address to an Internet Protocol address of a multi-tenant computing environment,
        where the multi-tenant computing environment comprises a set of private networks that each host one tenant's domain of a set of tenant domains, and
        where the DNS request comprises a Tenant-ID record that indicates that the Internet Protocol address is internal to one distinct domain of the set of tenant domains;
    extracting the Tenant-ID record from the DNS request; and
    forwarding the DNS request to a multi-tenant DNS server along with a notification that the DNS request requires a tenant-specific address resolution and an identification of the distinct domain.

2. The system of claim 1, where the multi-tenant DNS server is configured to perform a tenant-specific address-resolution procedure, in response to the notification that the DNS request requires a tenant-specific address resolution, by performing a lookup into a tenant-specific database that stores information sufficient to resolve the domain address into a unique identifier of an address comprised by an overlapping domain of the set of tenant domains.

3. The system of claim 1, where the multi-tenant DNS server is configured to perform a global address-resolution procedure, in response to receiving a DNS request that is not accompanied by a notification that the DNS request requires a tenant-specific address resolution, where the global address-resolution procedure comprises performing a lookup into a global database that stores information sufficient to resolve the domain address into a unique global Internet Protocol address that is comprised by the multi-tenant computing environment, and where the unique global Internet Protocol address is not comprised by the set of private networks.

4. The system of claim 1, where at least two domains of the set of tenant domains are overlapping domains that each comprise tenant-specific domain addresses incapable of being resolved to unique IP addresses.

5. The system of claim 1, where the Tenant-ID record is a resource record formatted in conformance with IETF standard RFC 1035.

6. The system of claim 5, where the system determines that the DNS request requires a tenant-specific address resolution as a function of a value stored in a TYPE field of the Tenant-ID record.

7. The system of claim 1, where the multi-tenant environment is a cloud-computing platform and where each private network is a distinct private overlay network hosted by the cloud-computing platform.

8. The system of claim 1, where the multi-tenant environment comprises both a cloud-computing platform and a non-cloud network.

9. A method for multi-tenant DNS resolution comprising:
    a processor of a multi-tenant DNS-resolution computer system receiving a DNS request to resolve a domain address to an Internet Protocol address of a multi-tenant computing environment,
        where the multi-tenant computing environment comprises a set of private networks that each host one tenant's domain of a set of tenant domains, and
        where the DNS request comprises a Tenant-ID record that indicates that the Internet Protocol address is internal to one distinct domain of the set of tenant domains;
    extracting the Tenant-ID record from the DNS request; and
    forwarding the DNS request to a multi-tenant DNS server along with a notification that the DNS request requires a tenant-specific address resolution and an identification of the distinct domain.

10. The method of claim 9, where the multi-tenant DNS server is configured to perform a tenant-specific address-resolution procedure, in response to the notification that the DNS request requires a tenant-specific address resolution, by performing a lookup into a tenant-specific database that stores information sufficient to resolve the domain address into a unique identifier of an address comprised by an overlapping domain of the set of tenant domains.

11. The method of claim 9, where the multi-tenant DNS server is configured to perform a global address-resolution procedure, in response to receiving a DNS request that is not accompanied by a notification that the DNS request requires a tenant-specific address resolution, where the global address-resolution procedure comprises performing a lookup into a global database that stores information sufficient to resolve the domain address into a unique global Internet Protocol address that is comprised by the multi-tenant computing environment, and where the unique global Internet Protocol address is not comprised by the set of private networks.

12. The method of claim 9, where the multi-tenant environment is a cloud-computing platform and where each private network is a distinct private overlay network hosted by the cloud-computing platform.

13. The method of claim 9, where the multi-tenant environment comprises both a cloud-computing platform and a non-cloud network.

14. The method of claim 9, further comprising providing at least one support service for at least one of creating, integrating, hosting, maintaining, and deploying computer-readable program code in the computer system, wherein the computer-readable program code in combination with the computer system is configured to implement the receiving, the extracting, and the forwarding.

15. A computer program product, comprising a computer-readable hardware storage device having a computer-readable program code stored therein, the program code configured to be executed by a DNS-resolution system comprising a processor, a memory coupled to the processor, and a computer-readable hardware storage device coupled to the processor, the storage device containing program code configured to be run by the processor via the memory to implement a method for multi-tenant DNS resolution, the method comprising:

receiving a DNS request to resolve a domain address to an Internet Protocol address of a multi-tenant computing environment, where the multi-tenant computing environment comprises a set of private networks that each host one tenant's domain of a set of tenant domains, and where the DNS request comprises a Tenant-ID record that indicates that the Internet Protocol address is internal to one distinct domain of the set of tenant domains;

extracting the Tenant-ID record from the DNS request; and forwarding the DNS request to a multi-tenant DNS server along with a notification that the DNS request requires a tenant-specific address resolution and an identification of the distinct domain.

16. The computer program product of claim 15, where the multi-tenant DNS server is configured to perform a tenant-specific address-resolution procedure, in response to the notification that the DNS request requires a tenant-specific address resolution, by performing a lookup into a tenant-specific database that stores information sufficient to resolve the domain address into a unique identifier of an address comprised by an overlapping domain of the set of tenant domains.

17. The computer program product of claim 15, where the multi-tenant DNS server is configured to perform a global address-resolution procedure, in response to receiving a DNS request that is not accompanied by a notification that the DNS request requires a tenant-specific address resolution, where the global address-resolution procedure comprises performing a lookup into a global database that stores information sufficient to resolve the domain address into a unique global Internet Protocol address that is comprised by the multi-tenant computing environment, and where the unique global Internet Protocol address is not comprised by the set of private networks.

18. The computer program product of claim 15, where the Tenant-ID record is a resource record formatted in conformance with IETF standard RFC 1035, and where the system determines that the DNS request requires a tenant-specific address resolution as a function of a value stored in a TYPE field of the Tenant-ID record.

19. The computer program product of claim 15, where the multi-tenant environment is a cloud-computing platform and where each private network is a distinct private overlay network hosted by the cloud-computing platform.

20. The computer program product of claim 15, where the multi-tenant environment comprises both a cloud-computing platform and a non-cloud network.

* * * * *